United States Patent Office 3,366,771
Patented Jan. 30, 1968

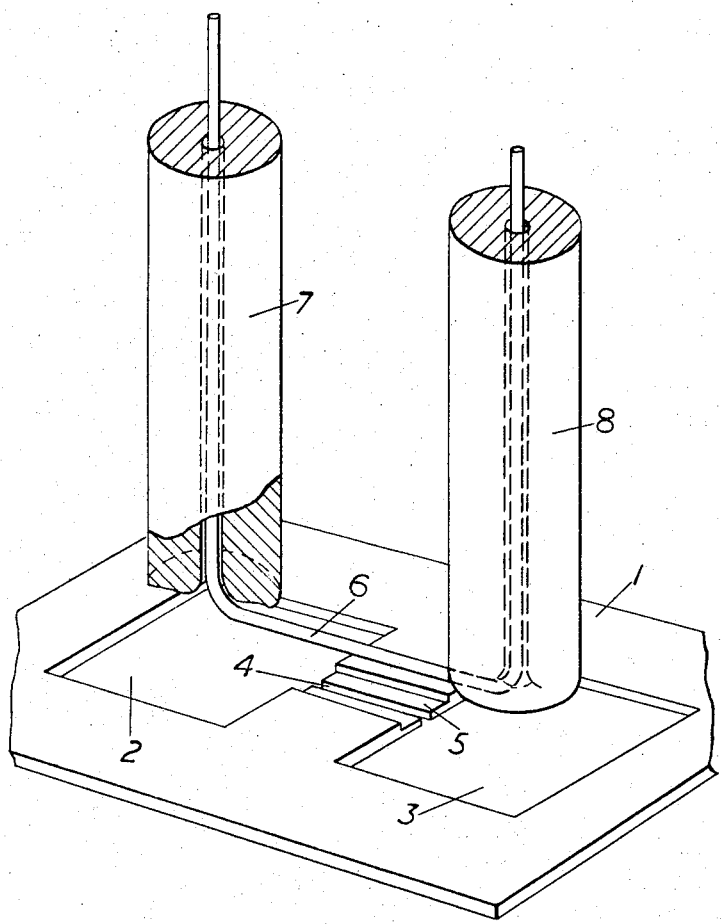

3,366,771
SPARK-EROSION MACHINING
Thomas Meirion Jackson, Bishop's Stortford, and Ronald Carol Stern, Cheshunt, England, assignors to International Standard Electric Corporation, New York, N.Y., a corporation of Delaware
Filed May 26, 1964, Ser. No. 370,305
3 Claims. (Cl. 219—69)

ABSTRACT OF THE DISCLOSURE

A device for machining a groove or slot in a workpiece by means of an electrical spark discharge between a filamentary electrode and the material of the workpiece. The filamentary electrode is supported by a pair of tubular guide members, through which the electrode may be advanced so that worn-out electrode material is constantly replaced by fresh material. The tubular guides permit precise positioning of the filamentary electrode with respect to the workpiece.

This invention relates to spark-erosion machining, and, more particularly, to a method of spark erosion and apparatus for machining thin slots.

According to the invention there are provided a method and apparatus of spark erosion for machining a slot in a workpiece to interconect two spaced apertures in said workpiece, in which a wire or strip cutting electrode extends between the ends of two parallel guide members, each positioned in line with one of said apertures so as to pass through said aperture.

An embodiment of the invention will now be described with reference to the single figure of the accompanying drawing, which shows details of a cutting-electrode structure and a slotted workpiece.

A workpiece 1 comprising a flat plate of, for example, stainless steel, is provided with two spaced apertures 2 and 3. It is required to machine a slot 4 in the workpiece to interconnect the two apertures, the slot 4 lying in an area 5 of the workpiece between the apertures where the thickness of the plate is reduced. Reduction of thickness in the area 5, and provision of the two apertures 2 and 3 may be accomplished by any convenient method, such as photoetching.

A cutting electrode 6 to machine the slot 4 is formed by a wire or strip, for example of copper or tungsten, extending between the ends of two parallel guide members 7 and 8 which are tubes of a material such as stainless steel.

The guide members are carried by the machine spindle (not shown), and the cutting electrode passes through the tubes 7 and 8 between a supply spool (not shown) and a take-up spool (not shown) also carried by the machine spindle.

Thus the electrode 6 extends across the workpiece 1, which is positioned so that the electrode lies over the reduced-thickness area 5 in the required position of the slot 4, and the guide members are so spaced as to be passed one through each of the apertures 2 and 3.

The workpiece 1 and electrode 6 are, of course, immersed in a suitable dielectric fluid, with the workpiece 1 held stationary by the machine table (not shown). The electrode 6 is connected to the negative pole of the power supply and the workpiece 1 to the positive pole.

The machine spindle is progressively lowered while cutting occurs as the electrode machines the slot 4, and the guide members 7 and 8 pass through the apertures 2 and 3.

The electrode feed is so arranged that either the electrode is continuously fed through the tubes 7 and 8, or preferably stepwise fed by the required amount for each slot. This minimizes the effect of electrode wear.

The tubes 7 and 8 can be grooved to facilitate the electrode feed, or can be made of a material having a low coefficient of friction such as alumina; alternatively, jewel bearings can be inserted into the ends of metal tubes.

As an alternative to tubular guide members through which the electrode passes, end-slotted rods may be used with the electrode passing across and guided by the end of each rod. In order to permit the rod guides to pass through the apertures in the workpiece, the path of the cutting electrode from and to the supply and take up spools respectively must be such that the electrode does not foul the apertures.

The outline of the two apertures 2 and 3 and of the interconnecting slot 4 is one of a typical cryotron element for cryogenic computers. These elements are manufactured by the use of an evaporation mask; and a typical application of the above method is in the manufacture of such evaporation masks, which may contain a large number of cut-out portions up to 1000 on a 4-inch square, each shaped as shown in the drawing, to extremely close dimensional tolerances ($\pm 1$ micron). Typical dimensions of the slot 4 may be .001 inch wide and .010 inch long with material thickness at the slot of .002 inch.

For a mask area of 4" x 4", this material thickness is not sufficiently rigid to ensure the required degree of flatness (within .002"). This can be overcome by counterboring a thicker mask, say .010" and locating the slot in the counterbored section. A larger aperture, say .020" square, is required at the ends of the slots in order to terminate the element for interconnection purposes.

The spark-erosion process is well suited to meet the requirements for the removal of small quantities of material with high accuracy. Assuming that automatic control equipment is available for aperture positioning, the outstanding feature is to minimize the effect of electrode erosion.

The method described above offers the possibility of eliminating the effect of electrode wear by providing a new electrode for each slot.

A wire cutting electrode of .0006 inch diameter is suitable for machining the .001 inch wide slot, with the electrode passing through tubular guide members of .012 inch outside diameter.

While we have described the principles of our invention in connection with specific apparatus, it is to be clearly understood that this description is made only by way of example and not as a limitation on the scope of our invention, as set forth in the accompanying claims.

We claim:
1. Apparatus for spark machining a narrow slot between openings in a conductive workpiece, said apparatus comprising a pair of substantially parallel tubular guides extending somewhat perpendicularly away from said workpiece and having one end of each of said tubular guides positioned close to respective openings in said workpiece, and a filamentary conductor passing through each of said tubular guides with an intermediate portion of said filamentary conductor disposed close to said workpiece in the region between the ends of said respective tubular guides.

2. Apparatus for spark machining a narrow slot between openings in a conductive workpiece, said apparatus comprising a pair of tubular guides having one end of each said tubular guide positioned close to respective openings in said workpiece, and a filamentary conductor passing through each of said tubular guides with an intermediate portion of said filamentary conductor disposed close to said workpiece in the region between the ends of said respective tubular guides, in which said tubular guides are positioned parallel to each other and substantially normal to a surface of said workpiece.

3. Apparatus for spark machining a narrow slot between openings in a conductive workpiece, said apparatus comprising a pair of tubular guides having one end of each said tubular guide positioned close to respective openings in said workpiece, and a filamentary conductor passing through each of said tubular guides with an intermediate portion of said filamentary conductor disposed close to said workpiece in the region between the ends of said respective tubular guides, in which said intermediate portion of said filamentary conductor is substantially straight so that said intermediate portion, together with the portions of said filamentary conductor passing through said respective tubular guides, defines a substantially U-shaped configuration.

References Cited

UNITED STATES PATENTS

| 2,101,913 | 12/1937 | Meyer | 219—233 X |
| 2,715,670 | 8/1955 | Dicke | 219—235 |
| 2,785,280 | 3/1957 | Eisler et al. | 219—69 |
| 2,794,110 | 5/1957 | Griffith | 219—69 |
| 2,974,216 | 3/1961 | Inoue | 219—69 |

RICHARD M. WOOD, *Primary Examiner.*

R. F. STAUBLY, *Assistant Examiner.*